3,354,153
3-ALKYLENE HEMITHIOKETALS AND 3-ENOL ETHERS OF STEROIDS

George Karmas, Bound Brook, N.J., assignor to Ortho Pharmaceutical Corporation, a corporation of New Jersey
No Drawing. Filed Dec. 7, 1965, Ser. No. 512,200
9 Claims. (Cl. 260—239.55)

ABSTRACT OF THE DISCLOSURE $\Delta^5$ and $\Delta^{5(10)}$-hemithioketals of steroidal 4-en-3-ones are intermediates for the preparation of the corresponding $\Delta^{3,5}$-enol ethers through the cleavage of the sulfur to carbon linkage of the hemithioketal moiety.

---

The present invention relates to steroidal hemithioketals, enol ethers derived therefrom and their methods of preparation.

More particularly, the present invention relates to $\Delta^5$- and $\Delta^{5(10)}$-hemithioketals prepared from steroidal 4-en-3-ones and to the $\Delta^{3,5}$-3-enol ethers which result from the cleavage of the hemithioketal moiety.

The novel $\Delta^5$- and $\Delta^{5(10)}$-hemithioketals of the present invention are prepared from steroidal 4-en-3-ones by reaction with β-mercaptoethanol in the presence of an acid catalyst such as p-toluenesulfonic acid. A typical reaction diagram for the preparation of the $\Delta^5$-hemithioketals is as follows:

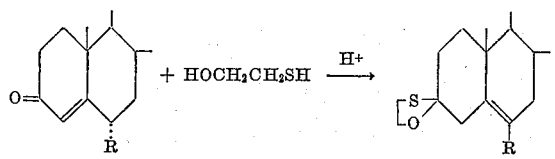

wherein R is hydrogen, methyl, chloro or fluoro. The above described reaction is carried out according to a procedure such as that of Djerassi and Gorman, J. Am. Chem. Soc., 75, 3703–8 (1953).

It has been found that the sulfur to carbon linkage of the hemithioketal moiety is cleaved by treatment of the novel hemithioketals of the present invention with acetic anhydride in the presence of an acid catalyst such as p-toluenesulfonic acid, to form the corresponding $\Delta^{3,5}$-enol ethers. Typical reaction diagrams showing the cleavage of the hemithioketal are as follows:

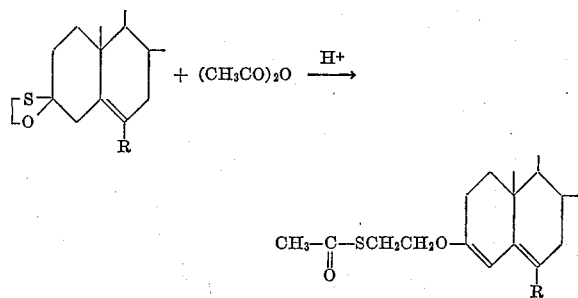

wherein R is hydrogen, methyl, chloro or fluoro.

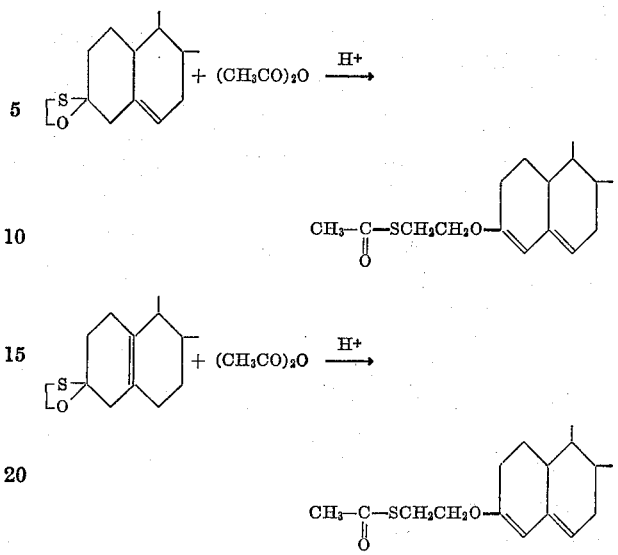

The novel $\Delta^5$- and $\Delta^{5(10)}$-hemithioketals and $\Delta^{3,5}$-thioenol ethers of the present invention exhibit important pharmacological properties as antilittering agents. While the precise mode and site of action of all of the novel compounds of the invention is not clearly understood, it has been found that compounds of the present invention exhibit progestational activity.

The novel hemithioketals of the invention are of the following formulae:

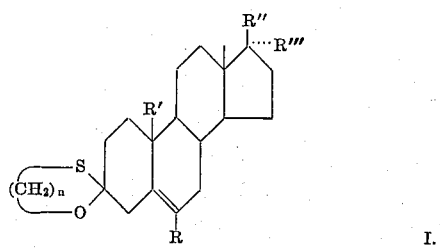

I.

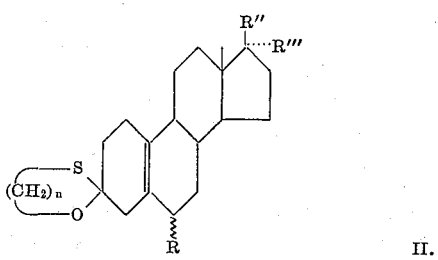

II.

wherein R is hydrogen, methyl, chloro or fluoro, R' is hydrogen or methyl, R" is hydroxy, acetyl or acetoxy, R''' is hydrogen, lower alkyl of from 1 to 8 carbon atoms, lower acyloxy of from 1 to 8 carbon atoms or —C≡CX wherein X is hydrogen, chloro or lower alkyl of from 1 to 8 carbon atoms and $n$ is the integer 2 or 3.

The novel thioenol ethers of the invention are of the following formula:

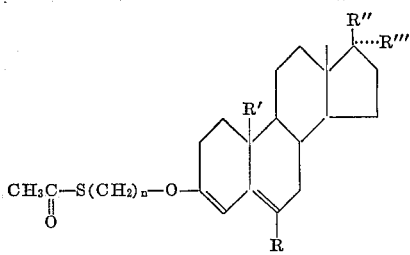

wherein R is hydrogen, methyl, chloro or fluoro, R′ is hydrogen or methyl, R″ is acetyl or acetoxy, R‴ is hydrogen, lower alkyl of from 1 to 8 carbon atoms, lower acyloxy of from 1 to 8 carbon atoms or —C≡CX wherein X is hydrogen, chloro or lower alkyl of from 1 to 8 carbon atoms and $n$ is the integer 2 or 3.

Typical steroidal 4-en-3-ones from which the hemithioketals of the present invention may be prepared are:

testosterone
6α-methyltestosterone
6β-methyltestosterone
6α-fluorotestosterone
6β-fluorotestosterone
6α,17α-dimethyltestosterone
6α-fluoro-17α-methyltestosterone
6α-methyl-17α-ethynyltestosterone
6β-methyl-17α-ethynyltestosterone
6α-methyl-17α-(prop-1-yne-1-yl) testosterone
6α-methyl-17α-ethyltestosterone
6α-methyl-17α-ethyl-19-nortestosterone
17α-methyltestosterone
17α-ethyltestosterone
17α-ethynyltestosterone
17α-(prop-1-yne-1-yl) testosterone
17α-(but-1-yne-1-yl) testosterone
17α-(hex-1-yne-1-yl) testosterone
17α-chlorethynyltestosterone
testosterone acetate
17α-methyl-19-nortestosterone
17α-ethyl-19-nortestosterone
17α-butyl-19-nortestosterone
17α-ethynyl-19-nortestosterone
19-nortestosterone acetate
19-nortestosterone
6α-methyl-17α-hydroxyprogesterone
6α-methyl-17α-acetoxyprogesterone
6α-methyl-17α-propionoxyprogesterone
6α-fluoro-17α-hydroxyprogesterone
6α-fluoro-17α-acetoxyprogesterone
6α-fluoro-17α-propionoxyprogesterone
6α-chloro-17α-hydroxyprogesterone
6α-chloro-17α-acetoxyprogresterone
6α-chloro-17α-propionoxyprogesterone
6α-methyl-17α-hydroxy-19-norprogesterone
6α-methyl-17α-acetoxy-19-norprogesterone
6α-fluoro-17α-hydroxy-19-norprogesterone
6α-fluoro-17α-acetoxy-19-norprogesterone
17α-methylprogesterone
17α-hydroxyprogesterone
17α-acetoxyprogesterone
17α-propionoxyprogesterone
17α-caproxyprogesterone
17α-ethynyl-19-nortestosterone acetate
6α-methyl-17α-ethynyl-19-nortestosterone acetate
17α-(prop-1-yne-1-yl)-19-nortestosterone acetate The following examples illustrate the invention:

*Example I.—17α-acetoxypregn-5-ene-3,20-dione 3-ethylenehemithioketal*

A mixture of 10.0 g. of 17α-acetoxyprogesterone, 10 ml. of β-mercaptoethanol, 500 mg. of p-toluenesulfonic acid and 500 ml. of benzene is boiled under reflux for three hours, with constant separation of water from the condensate by means of a Dean-Stark trap. After cooling to room temperature, the benzene solution is washed with a saturated aqueous sodium bicarbonate solution and then it is dried with anhydrous magnesium sulfate, filtered and evaporated to dryness under vacuum to obtain a mixture of crystalline solids. To this is added 300 ml. of acetone and the resulting suspension is stirred and boiled gently for five minutes. It is then cooled to 20° C. and filtered to remove insoluble material. The filtrate of acetone-soluble material is boiled down to a volume of 40 ml. and this is cooled to 20° C., and again filtered to remove more insoluble solid. The filtrate is now boiled down to 13 ml. and chilled to 0° C. to afford 1.0 g. of 17α-acetoxypregn-5-ene-3,20-dione 3-ethylenehemithioketal, white flakes which melt at 218–220° C. A second crop, amounting to 0.1–0.2 g. may be obtained by reworking of the mother liquor from the 1.0 g. portion.

*Analysis.*—Calcd. for $C_{25}H_{36}O_4S$: C, 69.43; H, 8.39. Found: C, 69.67; H, 8.64.

$\lambda\lambda_{max.}$: 5.76, 5.82, 7.97, 9.30, 10.32$\mu$.
$[\alpha]_D^{25}$ —42° (chl.).

Following the procedure of Example I, but starting with:

testosterone,
testosterone acetate,
17α-methyltestosterone,
17α-ethyltestosterone,
17α-ethynyltestosterone,
17α-(hex-1-yne-1-yl)-testosterone,
17α-chloroethynyltestosterone,
17α-methylprogesterone,
17α-hydroxyprogesterone, and
17α-propionoxyprogesterone there are prepared respectively, 5-androsten-17β-ol-3-one 3-ethylenehemithioketal,
5-androsten-17β-ol-3-one 17-acetate 3-ethylenehemithioketal,
17α-methyl-5-androsten-17β-ol-3-one 3-ethylenehemithioketal,
17α-ethyl-5-androsten-17β-ol-3-one 3-ethylenehemithioketal,
17α-ethynyl-5-androsten-17β-ol-3-one 3-ethylenehemithioketal,
17α-(hex-1-yne-1-yl)-5-androsten-17β-ol-3-one 3-ethylenehemithioketal,
17α-(chloroethynyl)-5-androsten-17β-ol-3-one 3-ethylenehemithioketal,
17α-methylpregn-5-ene-3,20-dione 3-ethylenehemithioketal,
17α-hydroxypregn-5-ene-3,20-dione 3-ethylenehemithioketal, and
17α-propionoxypregn-5-ene-3,20-dione 3-ethylenehemithioketal.

*Example II.—3-(β-acetylthioethoxy)-17α-acetoxypregna-3,5-dien-20-one*

A mixture of 1.1 g. of 17α-acetoxypregna-5-ene-3,20-dione 3-ethylenehemithioketal (as obtained in Example I), 1.0 g. of p-toluenesulfonic acid monohydrate, and 20 ml. of acetic anhydride is stirred vigorously at 25° C. for fifteen minutes and then it is cooled to 10° C. and 4 ml. of pyridine is added. This mixture is poured into 500 ml. of an ice and water mixture to which 60 ml. of pyridine has previously been added. After the precipitated oil has become partially crystalline, it is separated by filtration and then dissolved in 100 ml. of ethyl ether. The ether solution is dried with anhydrous potassium carbonate, and after filtration to remove drying agent it is reduced to a volume of 8 ml. Storing of this concentrated ether solution at 0° C. affords 0.48 g. of yellow prisms of the desired enol ether. Later crops of the same material, totalling 0.3 g., are obtained by further reworking of the motor liquor. The total of 0.78 g. of crude enol ether is now recrystallized from ethyl ether to afford 0.55 g. of 3-(β-acetylthioethoxy)-17α-acetoxypregna-3,5-dien-20-one, large yellow prisms which melt at 145–150° C.

Analysis.—Calcd. for $C_{27}H_{38}O_5S$: C, 68.38; H, 8.08. Found: C, 68.45; H, 8.14.

$\lambda\lambda_{max}$: 237 mμ (22,400); 5.74, 5.82, 5.87, 6.03, 6.12, 7.98, 10.30, 11.20μ.

$[\alpha]_D^{25}$ —103° (chl.).

Following the procedure of Example II, but starting with:

5-androsten-17β-ol-3-one 3-ethylenehemithioketal,
5-androsten-17β-ol-3-one 17-acetate 4-ethylenehemithioketal,
17α-methyl-5-androsten-17β-ol-3-one 3-ethylenehemithioketal,
17α-ethyl-5-androsten-17β-ol-3-one 3-ethylenehemithioketal,
17α-ethynyl-5-androsten-17β-ol-3-one 3-ethylenehemithioketal,
17α-(hex-1-yne-1-yl)-5-androsten-17β-ol-3-one 3-ethylenehemithioketal,
17α-(chloroethynyl)-5-androsten-17β-ol-3-one 3-ethylenehemithioketal,
17α-methylpregn-5-ene-3,20-dione 3-ethylenehemithioketal,
17α-hydroxypregn-5-ene-3,20-dione 3-ethylenehemithioketal, and
17α-propionoxypregn-5-ene-3,20-dione 3-ethylenehemithioketal there are prepared respectively, 3-(β-acetylthioethoxy-17β-acetoxyandrosta-3,5-diene,
3-(β-acetylthioethoxy)-17β-acetoxyandrosta-3,5-diene,
3-(β-acetylthioethoxy)-17α-methyl-17β-acetoxyandrosta-3,5-diene,
3-(β-acetylthioethoxy)-17α-ethyl-17β-acetoxyandrosta-3,5-diene,
3-(β-acetylthioethoxy)-17α-ethynyl-17β-acetoxyandrosta-3,5-diene,
3-(β-acetylthioethoxy)-17α-(hex-1-yne-1-yl)-17β-acetoxyandrosta-3,5-diene,
3-(β-acetylthioethoxy)-17α-chloroethynyl-17β-acetoxyandrosta-3,5-diene,
3-(β-acetylthioethoxy)-17α-methylpregna-3,5-diene-20-one,
3-(β-acetylthioethoxy)-17α-acetoxypregna-3,5-diene-20-one, and
3-(β-acetylthioethoxy)-17α-propionoxypregna-3,5-diene-20-one.

*Example III.—6-methyl-17α-acetoxypregn-5-ene-3,20-dione 3-ethylenehemithioketal*

A mixture of 2.5 g. of p-toluenesulfonic acid monohydrate and 1500 ml. of benzene is boiled under reflux for one hour, with separation of water from the condensate by means of a Dean-Stark trap. 50.0 g. of 6α-methyl-17α-acetoxyprogesterone and 50 ml. of β-mercaptoethanol are added and this mixture is boiled under reflux for three hours with separation of water by means of the Dean-Stark trap. After cooling to room temperature, the benzene solution is washed with aqueous sodium bicarbonate, dried with anhydrous magnesium sulfate, filtered and evaporated under vacuum to a viscous residue of crude hemithioketal. The latter is dissolved in 100 ml. of warm acetone and this solution is chilled at 0° C. to afford 17.0 g. of white prisms. Concentration and chilling of the mother liquor affords an additional 3.0 g. as a second crop. Recrystallization of this total of 20 g. from ethyl acetate finally affords 14.0 g. (in four crops) of 6-methyl-17α - acetoxypregn-5-ene-3,20-dione 3-ethylenehemithioketal, white flakes which melt at 223–227° C.

Analysis.—Calcd. for $C_{26}H_{38}O_4S$: C, 70.00; H, 8.57. Found: C, 70.21; H, 8.47.

$\lambda\lambda_{max}$: 5.76, 5.81, 7.97, 9.15, 9.28, 10.30, 11.92μ.

$[\alpha]_D^{25}$ —44.0° (chl.)

Following the procedure of Example III, but starting with:

6α-methyltestosterone,
6β-methyltestosterone,
6α-fluorotestosterone,
6β-fluorotestosterone,
6α-fluoro-17α-methyltestosterone,
6α,17α-dimethyltestosterone,
6α-methyl-17α-ethynyltestosterone,
6β-methyl-17α-ethynyltestosterone,
6α-methyl-17α-(prop-1-yne-yl) testosterone,
6α-methyl-17α-ethyltestosterone,
6α-methyl-17α-hydroxyprogesterone,
6α-fluoro-17α-acetoxyprogesterone,
6α-chloro-17α-acetoxyprogesterone,
6α-fluoro-17α-hydroxyprogesterone, and
6-chloro-17α-hydroxyprogesterone there are prepared respectively, 6-methyl-5-androsten-17β-ol-3-one 3-ethylenehemithioketal,
6-fluoro-5-androsten-17β-ol-3-one 3-ethylenehemithioketal,
6-fluoro-17α-methyl-5-androsten-17β-ol-3-one 3-ethylenehemithioketal,
6,17α-dimethyl-5-androsten-17β-ol-3-one 3-ethylenehemithioketal,
6-methyl-17α-ethynyl-5-androsten-17β-ol-3-one 3-ethylenehemithioketal,
6-methyl-17α-(prop-1-yne-1-yl)-5-androsten-17β-ol-3-one 3-ethylenehemithioketal,
6-methyl-17α-ethyl-5-androsten-17β-ol-3-one 3-ethylenehemithioketal,
6-methyl-17α-hydroxypregn-5-ene-3,20-dione 3-ethylenehemithioketal,
6-fluoro-17α-acetoxypregn-5-ene-3,20-dione 3-ethylenehemithioketal,
6-chloro-17α-acetoxypregn-5-ene-3,20-dione 3-ethylenehemithioketal,
6-fluoro-17α-hydroxypregn-5-ene-3,20-dione 3-ethylenehemithioketal, and
6-chloro-17α-hydroxypregn-5-ene-3,20-dione 3-ethylenehemithioketal.

*Example IV.—3-(β-acetylthioethoxy)-6-methyl-17α-acetoxypregna-3,5-dien-20-one*

To a solution of 10.0 g. of p-toluenesulfonic acid monohydrate in 200 ml. of acetic anhydride is added 10.0 g. of finely-divided 6 - methyl - 17α-acetoxypregn-5-ene-3,20-dione 3-ethylenehemithioketal (as obtained in Example III), and the mixture is stirred at 25° C. for twenty minutes. The resulting clear red solution is cooled to 10° C. and to it is added 50 ml. pyridine and this mixture is then poured into 2000 ml. of an ice and water mixture to which 600 ml. of pyridine has previously been added. After the precipitated oil has become partially crystalline, it is separated by filtration and then dissolved in 200 ml. of ether. The ether solution is washed with aqueous sodium bicarbonate solution and with water, and then it is dried with anhydrous potassium carbonate. After filtration to remove drying agent, the ether solution is reduced to a volume of 20 ml. and stored at 0° C. to effect crystallization of 3.3 g. of the enol ether. The material remaining in the ethereal mother liquor is developed onto a chromatographic column of acidic alumina and eluted with ether-plus-benzene (1:1) to afford 1.5 g. more of crude enol ether. The combined portions of enol ether are recrystallized from ethyl ether to afford 4.1 g. of 3-(β-acetylthioethoxy) - 6-methyl-17α-acetoxypregna-3,5-dien-20-one as pale yellow prisms which melt at 122–124° C.

*Analysis.*—Calcd. for $C_{28}H_{40}O_5S$: C, 68.93; H, 8.26. Found: C, 68.68; H, 8.23.

$\lambda\lambda_{max}$: 245 m$\mu$ (20,800); 5.73, 5.81, 5.88, 6.02, 6.12, 7.97, 8.25, 10.32, 11.25, 12.01$\mu$.

$[\alpha]_D^{25}$ —130° (chl.).

Following the procedure of Example IV, but starting with:

6-methyl-5-androsten-17$\beta$-ol-3-one 3-ethylenehemithioketal, 6-fluoro-5-androsten-17$\beta$-ol-3-one 3-ethylenehemithioketal, 6-fluoro-17$\alpha$-methyl-5-androsten-17$\beta$-ol-3-one 3-ethylenehemithioketal, 6,17$\alpha$-dimethyl-5-androsten-17$\beta$-ol-3-one 3-ethylenehemithioketal, 6-methyl-17$\alpha$-ethynyl-5-androsten-17$\beta$-ol-3-one 3-ethylenehemithioketal, 6-methyl-17$\alpha$-(prop-1-yne-1-yl)-5-androsten-17$\beta$-ol-3-one 3-ethylenehemithioketal, 6-methyl-17$\alpha$-ethyl-5-androsten-17$\beta$-ol-3-one 3-ethylenehemithioketal, 6-methyl-17$\alpha$-hydroxypregn-5-ene-3,20-dione 3-ethylenehemithioketal, 6-fluoro-17$\alpha$-acetoxypregn-5-ene-3,20-dione 3-ethylenehemithioketal, 6-chloro-17$\alpha$-acetoxypregn-5-ene-3,20-dione 3-ethylenehemithioketal, 6-fluoro-17$\alpha$-hydroxypregn-5-ene-3,20-dione 3-ethylenehemithioketal, and 6-chloro-17$\alpha$-hydroxypregn-5-ene-3,20-dione 3-ethylenehemithioketal there are prepared respectively, 3-($\beta$-acetylthioethoxy)-6-methyl-17$\beta$-acetoxyandrosta-3,5-diene, 3-($\beta$-acetylthioethoxy)-6-fluoro-17$\beta$-acetoxyandrosta-3,5-diene, 3-($\beta$-acetylthioethoxy)-6-fluoro-17$\alpha$-methyl-17$\beta$-acetoxyandrosta-3,5-diene, 3-($\beta$-acetylthioethoxy)-6,17$\alpha$-dimethyl-17$\beta$-acetoxyandrosta-3,5-diene, 3-($\beta$-acetylthioethoxy)-6-methyl-17$\alpha$-ethynyl-17$\beta$-acetoxyandrosta-3,5-diene, 3-($\beta$-acetylthioethoxy)-6-methyl-17$\alpha$-(prop-1-yne-1-yl)-17$\beta$-acetoxyandrosta-3,5-diene, 3-($\beta$-acetylthioethoxy)-6-methyl-17$\alpha$-ethyl-17$\beta$-acetoxyandrosta-3,5-diene, 3-($\beta$-acetylthioethoxy)-6-methyl-17$\alpha$-acetoxypregna-3,5-diene-20-one, 3-($\beta$-acetylthioethoxy)-6-fluoro-17$\alpha$-acetoxypregna-3,5-diene-20-one, 3-($\beta$-acetylthioethoxy)-6-chloro-17$\alpha$-acetoxypregna-3,5-diene-20-one, 3-($\beta$-acetylthioethoxy)-6-fluoro-17$\alpha$-acetoxypregna-3,5-diene-20-one, and 3-($\beta$-acetylthioethoxy)-6-chloro-17$\alpha$-acetoxypregna-3,5-diene-20-one.

*Example V.*—17$\alpha$ - ethynyl - 17$\beta$ - acetoxyestr - 5(10)-en - 3 - one 3 - ethylenehemithioketal (A) and 17$\alpha$-ethynyl - 17$\beta$ - acetoxyestr - 5 - en - 3 - one 3 - ethylenehemithioketal (B)

A. A mixture of 60.0 g. of 17$\alpha$ - ethynyl - 19 - nortestosterone, 60 ml. of B - mercaptoethanol, and 3.0 g. of p - toluenesulfonic acid monohydrate in 3000 ml. of benzene is boiled under reflux for three and one-half hours, with constant separation of water from the condensate by means of a Dean-Stark trap. After cooling to room temperature, the benzene solution is washed with aqueous sodium bicarbonate solution and with water, and then it is dried with anhydrous magnesium sulfate, filtered to remove drying agent, and evaporated under vacuum to a viscous semicrystalline residue. The latter is developed onto a chromatographic column of neutral alumina. Elution with benzene, followed by ethyl ether, affords 25 g. of a mixture of products which must subsequently be separated by crystallization techniques.

The 25 g. of hemithioketal mixture is boiled under reflux for two and one-half hours with 800 ml. of acetic anhydride containing 2 ml. of pyridine and then this solution is cooled to 25° C. and poured into 4000 ml. of ice and water mixture containing 30 ml. of pyridine. The oil remaining after the acetic anhydride has hydrolyzed becomes crystalline on storage of the hydrolysis mixture at 0° for twenty hours. The tacky solid is isolated by filtration and is dried in air, and then it is boiled in 360 ml. of methanol. After filtration to clarify, the methanolic filtrate is allowed to cool slowly and is maintained at room temperature for two hours. The solid which has crystallized from the methanol is filtered off and dried to afford 5.5 g. of crude $\Delta^{5(10)}$ - hemithioketal, which is identified by its infrared absorption (see below). This is recrystallized twice from ethyl acetate to afford 3.6 g. of 17$\alpha$ - ethynyl - 17$\beta$ - acetoxyestr - 5(10) - en - 3 - one 3-ethylenehemithioketal (A), white prisms which melt at 178–180° C.

*Analysis.*—Calcd. for $C_{24}H_{32}O_3S$: C, 72.00; H, 8.05. Found: C, 72.01; H, 8.24.

$\lambda\lambda_{max}$: 3.05, 5.73, 8.00, 8.11, 9.02, 10.20, 11.79, 12.10$\mu$.

$[\alpha]_D^{25}$ +37.2° (chl.).

B. On standing at 25° C. for four days, the methanolic mother liquor from isolation of the $\Delta^{5(10)}$ - isomer (A, above) deposits a further quantity of crystalline material which is isolated by filtration to afford 4.6 g. of crude $\Delta^5$ - isomer, identified by its infrared absorption (see below). Further purification of this isomer is effected through recrystallization of its corresponding 17$\beta$ - ol form, rather than the acetate which has been isolated.

The 4.6 g. of crude $\Delta^5$ - isomer is boiled under reflux for twenty minutes with 100 ml. of methanol containing 1.2 g. of potassium hydroxide. This saponification mixture is diluted with 800 ml. of water containing 2 ml. of acetic acid and the 17$\beta$ - ol is extracted with three small portions of methylene chloride. The combined extracts are dried with anhydrous magnesium sulfate, filtered, and then evaporated to a crystalline residue which is recrystallized from ethyl acetate to afford 2.7 g. of 17$\alpha$ - ethynylestr - 5 - en - 17$\beta$ - ol - 3 - one 3 - ethylenehemithioketal, white granules which melt at 176–179°.

*Analysis.*—Calcd. for $C_{22}H_{30}O_2S$: C, 73.75; H, 8.44. Found: C, 73.58; H, 8.68.

$[\alpha]_D^{25}$ +12.6° (chl.).

The purified $\Delta^5$ - isomer (17$\beta$ - ol) thus obtained is acetylated by boiling it under reflux for two hours in 55 ml. of acetic anhydride containing four drops of pyridine. After cooling of the acetic anhydride solution to 30° C., it is poured into 500 ml. of an ice and water mixture. The crystalline solid which forms after hydrolysis of the acetic anhydride is filtered off, dried in air, and recrystallized from ethyl ether to afford 2.4 g. of 17$\alpha$ - ethynyl - 17$\beta$-acetoxyestr - 5 - en - 3 - one 3 - ethylenehemithioketal (B), white prisms fhich melt at 162–165° C.

*Analysis.*—Calcd. for $C_{24}H_{32}O_3S$: C, 72.00; H, 8.05. Found: C, 71.75; H, 8.25.

$\lambda\lambda_{max}$: 3.02, 5.72, 8.00, 8.12, 10.21, 11.62, 11.91$\mu$.

$[\alpha]_D^{25}$ +1.2° (chl.).

C. The methanolic mother liquor from which the $\Delta^{5(10)}$ - isomer has first been separated (part A) and from which the $\Delta^5$ - isomer has later crystallized (part B) is reduced in volume to 60 ml. and stored at 0° C. for two days to effect crystallization of 6.7 g. of a mixture of the isomeric hemithioketals. This material may be subjected to the separation of isomers detailed in parts A and B, but this separation is not necessary for conversion to the enol ether. The mixture may be used "as is" for acetylative cleavage to the enol ether (see Example VI, C.)

Following the procedure of Example V, but starting with:

17α-methyl-19-nortestosterone,
17α-ethyl-19-nortestosterone,
17α-butyl-19-nortestosterone,
17α-propynyl-19-nortestosterone,
19-nortestosterone acetate,
6α-fluoro-17α-hydroxy-19-norprogesterone,
6α-fluoro-17α-acetoxy-19-norprogesterone,
6α-methyl-17α-hydroxy-19-norprogesterone,
6α-methyl-17α-acetoxy-19-norprogesterone,
17α-ethynyl-19-nortestosterone acetate,
6α-methyl-17α-ethynyl-19-nortestosterone acetate, and
17α-(prop-1-yne-1-yl)-19-nortestosterone acetate there are prepared respectively, (A) 17α-methyl-5(10)-estren-17β-ol-3-one 3-ethylenehemithioketal,
(B) 17α-methyl-5-estren-17β-ol-3-one 3-ethylenehemithioketal,
(A) 17α-ethyl-5(10)-estren-17β-ol-3-one 3-ethylenehemithioketal,
(B) 17α-ethyl-5-estren-17β-ol-3-one 3-ethylenehemithioketal,
(A) 17α-butyl-5(10)-estren-17β-ol-3-one 3-ethylenehemithioketal,
(B) 17α-butyl-5-estren-17β-ol-3-one 3-ethylenehemithioketal.
(A) 17α-propynyl-5(10)-estren-17β-ol-3-one 3-ethylenehemithioketal,
(B) 17α-propynyl-5-estren-17β-ol-3-one 3-ethylenehemithioketal,
(A) 5(10)-estren-17β-ol-3-one 17-acetate 3-ethylenehemithioketal,
(B) 5-estren-17β-ol-3-one 17-acetate 3-ethylenehemithioketal,
(A) 6α-fluoro-17α-hydroxy-19-norpregn-5(10)-ene-3,20-dione 3-ethylenehemithioketal,
(B) 6-fluoro-17α-hydroxy-19-norpregn-5-ene-3,20-dione 3-ethylenehemithioketal,
(A) 6α-fluoro-17α-acetoxy-19-norpregn-5(10)-ene-3,20-dione 3-ethylenehemithioketal,
(B) 6-fluoro-17α-acetoxy-19-norpregn-5-ene-3,20-dione 3-ethylenehemithioketal,
(A) 6α-methyl-17α-hydroxy-19-norpregn-5(10)-ene-3,20-dione 3-ethylenehemithioketal,
(B) 6-methyl-17α-hydroxy-19-norpregn-5-ene-3,20-dione 3-ethylenehemithioketal,
(A) 6α-methyl-17α-acetoxy-19-norpregn-5(10)-ene-3,20-dione 3-ethylenehemithioketal,
(B) 6-methyl-17α-acetoxy-19-norpregn-5-ene-3,20-dione 3-ethylenehemithioketal,
(A) 17α-ethynyl-17β-acetoxyestr-5(10)-en-3-one 3-ethylenehemithioketal,
(B) 17α-ethynyl-17β-acetoxyestr-5-en-3-one 3-ethylenehemithioketal,
(A) 6α-methyl-17α-ethynyl-17β-acetoxyestr-5(10)-en-3-one 3-ethylenehemithioketal,
(B) 6-methyl-17α-ethynyl-17β-acetoxyestr-5-en-one 3-ethylenehemithioketal,
(A) 17α-(prop-1-yne-1-yl)-17β-acetoxyestr-5(10)-en-3-one 3-ethylenehemithioketal, and
(B) 17α-(prop-1-yne-1-yl)-17β-acetoxyestr-5-en-3-one 3-ethylenehemithioketal.

*Example VI.—3-(β-acetylthioethoxy)-17α-ethynyl-17β-acetoxyestra-3,5-diene*

A. A mixture of 1.1 g. of 17α-ethynyl-17β-acetoxyestr-5(10)-en-3-one 3-ethylenehemithioketal (as obtained in Example V, A) and 0.6 of p-toluenesulfonic acid monohydrate in 20 ml. of acetic anhydride is stirred vigorously at 25° C. for one hour, and then 5 ml. of pyridine is added and the mixture is poured into 350 ml. of ice and water to which 45 ml. of pyridine has previously been added. The pale yellow solid which remains after hydrolysis of the acetic anhydride is filtered off and dried in air and then it is recrystallized from acetone containing a few drops of pyridine to afford 0.9 g. of 3-(β-acetylthioethoxy) - 17α - ethynyl - 17β - acetoxyestra - 3,5-diene, cream colored flakes which melt at 165–168° C.

*Analysis.*—Calcd. for $C_{26}H_{34}O_4S$: C, 70.60; H, 7.74. Found: C, 70.96; H, 7.90.

$\lambda\lambda_{max}$: 239 mμ (22,700); 3.01, 5.72, 5.91, 7.92, 8.07, 8.13, 8.45, 9.81, 11.11, 11.75μ.

$[\alpha]_D^{25}$ −180° (chl.).

B. A mixture of 0.25 g. of 17α-ethynyl-17β-acetoxyestr-5-en-3-one 3-ethylenehemithioketal (as obtained in Example V, B) and 0.15 g. of p-toluenesulfonic acid monohydrate in 4 ml. of acetic anhydride is stirred vigorously at 25° C. for forty-five minutes and then the reaction mixture is worked up as detailed in A (above) with appropriate scaling down of quantities. Recrystallization of the crude enol ether affords 0.16 g. of cream flakes which melt at 165–168° C., and whose infrared spectrum is identical with that of the material obtained in A.

C. A mixture of 4.0 g. of the mixture of $\Delta^5$- and $\Delta^{5(10)}$-hemithioketal isomers (as isolated in Example V, C) and 2.4 g. of p-toluenesulfonic acid monohydrate in 80 ml. of acetic anhydride is stirred vigorously at 25° C. for forty-five minutes and then the reaction mixture is worked up as detailed in A (above) with appropriate scaling up of quantities. Recrystallization of the crude, air-dried enol ether from acetone affords 2.95 g. of cream flakes which melt at 165–168° C., and whose infrared spectrum is identical with that of the material obtained in A.

Following the procedure of Example VI, but starting with:

(A) 17α-methyl-5(10)-estren-17β-ol-3-one 3-ethylenehemithioketal,
(B) 17α-methyl-5-estren-17β-ol-3-one 3-ethylenehemithioketal,
(A) 17α-ethyl-5(10)-estren-17β-ol-3-one 3-ethylenehemithioketal,
(B) 17α-ethyl-5-estren-17β-ol-3-one 3-ethylenehemithioketal,
(A) 17α-butyl-5(10)-estren-17β-ol-3-one 3-ethylenehemithioketal,
(B) 17α-butyl-5-estren-17β-ol-3-one 3-ethylenehemithioketal,
(A) 17α-propynyl-5(10)-estren-17β-ol-3-one 3-ethylenehemithioketal,
(B) 17α-propynyl-5-estren-17β-ol-3-one 3-ethylenehemithioketal,
(A) 5(10)-estren-17β-ol-3-one 17-acetate 3-ethylenehemithioketal,
(B) 5-estren-17β-ol-3-one 17-acetate 3-ethylenehemithioketal,
(A) 6α-fluoro-17α-hydroxy-19-norpregn-5(10)-ene-3,20-dione 3-ethylenehemithioketal,
(B) 6-fluoro-17α-hydroxy-19-norpregn-5-ene-3,20-dione 3-ethylenehemithioketal,
(A) 6α-fluoro-17α-acetoxy-19-norpregn-5(10)-ene-3,20-dione 3-ethylenehemithioketal,
(B) 6-fluoro-17α-acetoxy-19-norpregn-5-ene-3,20-dione 3-ethylenehemithioketal,
(A) 6α-methyl-17α-hydroxy-19-norpregn-5(10)-ene-3,20-dione 3-ethylenehemithioketal,
(B) 6-methyl-17α-hydroxy-19-norpregn-5-ene-3,20-dione 3-ethylenehemithioketal,
(A) 6α-methyl-17α-acetoxy-19-norpregn-5(10)-ene-3,20-dione 3-ethylenehemithioketal,
(B) 6-methyl-17α-acetoxy-19-norpregn-5-ene-3,20-dione 3-ethylenehemithioketal,
(A) 17α-ethynyl-17β-acetoxyestr-5(10)-en-3-one 3-ethylenehemithioketal,
(B) 17α-ethynyl-17β-acetoxyestr-5-en-3-one 3-ethylenehemithioketal, (A) 6α-methyl-17α-ethynyl-17β-acetoxyestr-5(10)-en-3-one 3-ethylenehemithioketal,
(B) 6-methyl-17α-ethynyl-17β-acetoxyestr-5-en-3-one 3-ethylenehemithioketal,
(A) 17α-(prop-1-yne-1-yl)-17β-acetoxyestr-5(10)-en-one 3-ethylenehemithioketal, and
(B) 17α-(prop-1-yne-1-yl)-17β-acetoxyestr-5-en-3-one 3-ethylenehemithioketal there are prepared respectively, 3-(β-acetylthioethoxy)-17α-methyl-17β-acetoxyestra-3,5-diene,
3-(β-acetylthioethoxy)-17α-ethyl-17β-acetoxyestra-3,5-diene,
3-(β-acetylthioethoxy)-17α-butyl-17β-acetoxyestra-3,5-diene,
3-(β-acetylthioethoxy)-17α-propynyl-17β-acetoxyestra-3,5-diene,
3-(β-acetylthioethoxy)-17β-acetoxyestra-3,5-diene,
3-(β-acetylthioethoxy)-6-fluoro-17α-acetoxy-19-nor-pregna-3,5-dien-20-one,
3-(β-acetylthioethoxy)-6-fluoro-17α-acetoxy-19-nor-pregna-3,5-dien-20-one,
3-(β-acetylthioethoxy)-6-methyl-17α-acetoxy-19-nor-pregna-3,5-dien-20-one,
3-(β-acetylthioethoxy)-6-methyl-17α-acetoxy-19-nor-pregna-3,5-dien-20-one,
3-(β-acetylthioethoxy)-17α-ethynyl-17β-acetoxyestra-3,5-diene,
3-(β-acetylthioethoxy)-6-methyl-17α-ethynyl-17β-acetoxyestra-3,5-diene, and
3-(β-acetylthioethoxy)-17α-(prop-1-yne-1-yl)-17β-acetoxyestra-3,5-diene.

In the foregoing examples, the steroidal 4-en-3-ones are reacted with β-mercaptoethanol to form the corresponding 3-ethylene-hemithioketal. By reacting the steroidal 4-en-3-ones with γ-mercaptopropanol, the corresponding propylenehemithioketals are formed. Upon cleavage of the propylenehemithioketal moiety, the corresponding γ-acetylthiopropoxy compounds are obtained.

What is claimed is:
1. A compound selected from the group consisting of

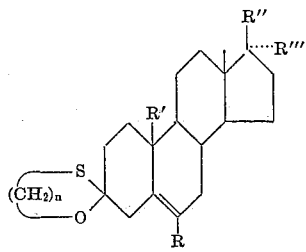

and

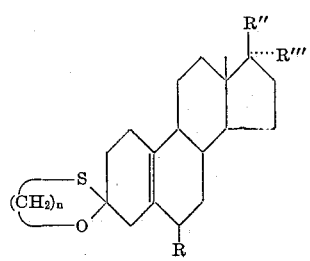

wherein R is selected from the group consisting of hydrogen, methyl, fluoro and chloro, R′ is selected from the group consisting of hydrogen and methyl, R″ is selected from the group consisting of hydroxy, acetyl and acetoxy, R‴ is selected from the group consisting of hydrogen, lower alkyl of from 1 to 8 carbon atoms, lower acyloxy of from 1 to 8 carbon atoms and —C≡CX wherein X is selected from the group consisting of hydrogen, chloro and lower alkyl of from 1 to 8 carbon atoms and $n$ is the integer 2 or 3.

2. 17α-acetoxypregn-5-ene-3,20-dione 3-ethylenehemithioketal as claimed in claim 1.
3. 6-methyl-17α-acetoxypregn-5-ene-3,20-dione 3-ethylenehemithioketal as claimed in claim 1.
4. 17α-ethynyl-17β-acetoxyestr-5(10)-en-3-one 3-ethylenehemithioketal as claimed in claim 1.
5. 17α-ethynyl-17β-acetoxyestr-5-en-3-one 3-ethylenehemithioketal as claimed in claim 1.
6.

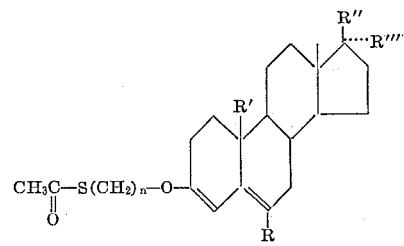

wherein R is selected from the group consisting of hydrogen, methyl, chloro, and fluoro, R′ is selected from from the group consisting of hydrogen and methyl, R″ is selected from the group consisting of acetyl and acetoxy, R‴ is selected from the group consisting of hydrogen, lower alkyl of from 1 to 8 carbon atoms, lower acyloxy of from 1 to 8 carbon atoms and —C≡CX wherein X is selected from the group consisting of hydrogen, chloro and lower alkyl of from 1 to 8 carbon atoms, and $n$ is the integer 2 or 3.

7. 3-(β-acetylthioethoxy)-17α-acetoxypregna-3,5-diene-20-one as claimed in claim 6.
8. 3-(β-acetylthioethoxy)-6-methyl-17α-acetoxypregna-3,5-diene-20-one as claimed in claim 6.
9. 3-(β-acetylthioethoxy)-17α-ethynyl-17β-acetoxyestra-3,5-diene as claimed in claim 6.

References Cited
UNITED STATES PATENTS

| | | | |
|---|---|---|---|
| 2,288,854 | 7/1942 | Stavely | 260—239.55 |
| 2,793,217 | 5/1957 | Muller | 260—397.45 |
| 3,162,629 | 12/1964 | Scheer | 260—239.5 |

OTHER REFERENCES

Karmas: Tetrahedron Letters No. 18, pp. 1093–1098 (1964) (p. 1095 relied on).
Weiss et al.: J. Med. Chem. 7, pp. 804–806 (1964).
Zderic et al.; Chem. Abstr., 54, 1602g (1960).

LEWIS GOTTS, *Primary Examiner.*

T. M. MESHBESHER, *Assistant Examiner.*

UNITED STATES PATENT OFFICE

CERTIFICATE OF CORRECTION

Patent No. 3,354,153  November 21, 1967

George Karmas

It is hereby certified that error appears in the above numbered patent requiring correction and that the said Letters Patent should read as corrected below.

Column 1, line 41, for "3703-8" read -- 3704-8 --; column 5, line 2, for "motor" read -- mother --; line 15, for "4-ethylenehemithioketals" read -- 3-ethylenehemithioketals --; column 6, line 22, for "6-chloro" read -- 6a-chloro --; column 7, line 3, for ".88" read -- 5.88 --.

Signed and sealed this 18th day of February 1969.

(SEAL)
Attest:

Edward M. Fletcher, Jr.
Attesting Officer

EDWARD J. BRENNER
Commissioner of Patents